United States Patent [19]

Komine et al.

[11] Patent Number: 4,490,823

[45] Date of Patent: Dec. 25, 1984

[54] INJECTION-LOCKED UNSTABLE LASER

[75] Inventors: Hiroshi Komine, Torrance; Stephen J. Brosnan, San Pedro, both of Calif.

[73] Assignee: Northrop Corporation, Hawthorne, Calif.

[21] Appl. No.: 472,704

[22] Filed: Mar. 7, 1983

[51] Int. Cl.³ .............................................. H01S 3/08
[52] U.S. Cl. ..................................................... 372/95
[58] Field of Search ...................... 372/19, 20, 95, 18, 372/102; 350/393

[56] References Cited

PUBLICATIONS

Goldhar et al., "An Injection Locked Unstable Resonator Rare-Gas Halide Discharge Laser of Narrow Linewidth and High Spatial Quality"; IEEE Jour. Quant. Elect., Feb. 1980, pp. 235-241.

*Primary Examiner*—William L. Sikes
*Assistant Examiner*—Léon Scott, Jr.
*Attorney, Agent, or Firm*—Terry J. Anderson; John E. Peele, Jr.

[57] ABSTRACT

A laser system for producing a laser beam in an unstable resonator whose spatial and temporal characteristics conform with those of a laser beam from a stable resonator. The laser system includes three reflectors, an optical switch and a laser gain medium positioned within an optical propagation path extending between the optical switch and the third reflector. The optical switch selectably exposes either the first or the second reflector to the aforesaid propagation path, the first and second reflectors being designed to form, in combination with the third reflector, a stable and an unstable resonator, respectively. In operation, the optical switch initially is set so as to include the first reflector in the laser resonator, thereby forming a stable resonator which produces a beam of laser light. A short time thereafter, the optical switch changes states so as to substitute the second reflector for the first, thereby forming an unstable resonator. The light from the stable resonator serves as "seed radiation" for the unstable resonator, so that the unstable resonator produces a light beam having the same spatial and temporal characteristics as the light from the stable resonator. The system permits the use of a single laser gain medium for both resonators, and it overcomes the need for holes or other surface discontinuities in the resonator reflectors which can degrade the quality of the laser's output beam.

1 Claim, 6 Drawing Figures

INJECTION-LOCKED UNSTABLE LASER

BACKGROUND OF THE INVENTION

1. Field of the Invention

The present invention relates to a laser apparatus in which laser light produced by a stable resonator is injected into the cavity of an unstable resonator, whereby the light output of the unstable resonator conforms to the spatial and temporal characteristics of the light from the stable resonator.

2. Description of the Prior Art

The fundamental components of a laser are a resonator, a gain medium, and an output extraction device. A laser resonator basically consists of two resonator reflectors between which light travels back and forth. The region between the two reflectors is termed the resonator cavity. A laser gain medium within the cavity amplifies the light as it repeatedly traverses the cavity.

A stable resonator is one in which the light beam maintains a limited diameter as it bounces back and forth between the two resonator reflectors. Most commonly, the output beam is extracted from the resonator cavity by making one of the resonator reflectors partially transmissive.

Stable resonator lasers are known for their ability to produce a light beam having high collimation and spatial coherence and having a smooth spatial intensity profile free of interference fringes, these characteristics being collectively known as good "beam quality". However, because of the limited diameter of the beam and the power density limitations of the laser gain medium, it is difficult to achieve high output power with a stable resonator laser.

An unstable resonator is one in which the diamter of the light beam increases progressively as it bounces back and forth between the two resonator reflectors. The portion of the beam whose diameter exceeds a certain value is generally extracted to form the output beam. Typical extraction techniques include deflecting the output beam away from the axis of the resonator cavity by an annular "scraper mirror" oriented at an angle to the axis, or else allowing the output beam to escape the cavity when its diameter exceeds that of one of the resonator reflectors.

Unstable resonator lasers generally are adapted to producing higher output power than stable resonator lasers, but generally cannot achieve the same degree of beam quality. Furthermore, tuning the wavelength of the laser beam is more difficult with an unstable resonator.

A known technique for operating an unstable resonator laser so as to achieve the desirable beam quality and spectral tunability of a stable resonator laser is "injection locking", which is the injection of the output beam from a stable resonator into the cavity of an unstable resonator in order to lock the unstable laser beam in conformity with the temporal and spatial characteristics of the stable laser beam.

One disadvantage of conventional systems for injection locking an unstable resonator laser is that they require two complete lasers and hence require two separate laser gain media, which significantly increases the cost of the system. Another disadvantage is that the two lasers must be excited with precise synchronization so that the stable resonator laser injects a light pulse into the cavity of the unstable resonator during the critical "build-up time" of the unstable resonator, that is, the time period after the initial excitation of the unstable resonator laser during which laser oscillations build up in the unstable resonator, before the oscillations become established at their natural, free-running (i.e., unlocked) value.

Conventional injection-locking systems typically admit the beam from the stable laser into the unstable laser cavity through a hole in the center of one of the two resonator mirrors of the unstable laser. A disadvantage of this system is that light diffraction at the perimeter of the hole degrades the spatial uniformity and collimation of the output beam by introducing interference fringes therein.

U.S. Pat. No. 3,622,907 to Tomlinson et al. discloses a related system in which a laser gain medium is enclosed by a pair of mirrors, one being concave and the other being flat near its center and convex elsewhere. The central region of the mirrors forms a stable laser oscillator, and the outer region forms a laser amplifier. A portion of the light beam generated in the central stable oscillator region is diffracted and thereby coupled into the surrounding amplifier region, from which the output beam is eventually extracted. A disadvantage of this system is that diffraction of the beam at the interface between the flat and convex regions of the second mirror introduces interference fringes which degrade the collimation and spatial uniformity of the output beam.

SUMMARY OF THE INVENTION

The present invention is a system for producing a laser beam in an unstable resonator whose spatial and temporal characterics conform with those of a laser beam from a stable resonator. The invention permits the use of a single laser gain medium for both resonators, and it overcomes the need for holes or other surface discontinuities in the resonator reflectors which can degrade the quality of the laser's output beam.

More specifically, the present invention comprises three reflectors, an optical switch and a laser gain medium. The gain medium is positioned within an optical propagation path extending between the optical switch and the third reflector. The optical switch selectably exposes either the first or the second reflector to the aforesaid propagation path, the first and second reflectors being designed to form, in combination with the third reflector, a stable and an unstable resonator, respectively.

In operation, the laser gain medium initially is excited by conventional means, and the optical switch is set so as to include the first reflector in the laser resonator, thereby forming a stable resonator which produces a beam of laser light. A short time thereafter, the optical switch changes states so as to substitute the second reflector for the first, thereby forming an unstable resonator. The light from the stable resonator serves as "seed radiation" for the unstable resonator, so that the unstable resonator produces a light beam having the same spatial and temporal characteristics as the light from the stable resonator.

BRIEF DESCRIPTION OF THE DRAWINGS

FIG. 4 is a schematic drawing of the preferred embodiment of the optical switch included in the laser of FIG. 1.

DETAILED DESCRIPTION OF THE PREFERRED EMBODIMENTS

Figure 1:
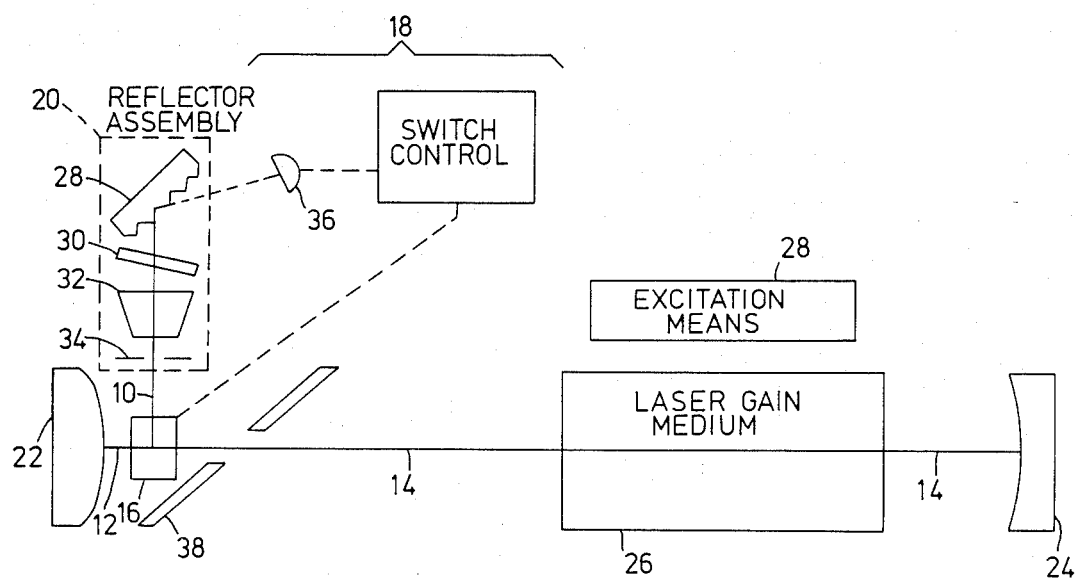
FIG. 1 is a schematic drawing of a laser according to the present invention.

Referring to FIG. 1, the laser of the present invention may be considered as having its optical elements arranged along three axes or optical propagation paths 10, 12 and 14. Although each of the propagation paths is shown in FIG. 1 as linear, and paths 12 and 14 are shown as collinear, in practice various reflectors and refractors may be inserted in the paths to alter the angles between the paths, to make one or more of the paths angular, or to fold a path back on itself to save space.

The three propagation paths 10, 12 and 14 intersect at optical beam switch 16. Under control of an electrical switch control circuit 18, optical beam switch 16 operates in either a first or second mode wherein it optically connects the third propagation path 14 to either the first path 10 or the second path 12, respectively.

The construction of optical beam switch 16 will be described in more detail subsequently. Briefly, the optical beam switch is an electro-optic device which, in response to an electrical control signal from circuit 18, is either optically transmissive or reflective. When the switch is in its transmissive mode, light travelling toward the optical switch 16 along path 12 or 14 passes through the switch and continues along path 14 or 12, respectively. When the switch is in its reflective mode, light travelling toward the switch along path 10 or 14 is reflected by the switch so as to continue along path 14 or 10, respectively.

The three propagation paths 10, 12 and 14 are terminated by first, second and third reflectors 20, 22 and 24, respectively. Using the well-known stability equations for laser resonator cavities, the lengths of the three paths and the focal lengths of the three reflectors are chosen so that the first and third paths, when connected by optical switch 16, form a stable resonator cavity, and the second and third paths, when connected by optical switch 16, form an unstable resonator cavity.

A conventional laser gain medium 26 is positioned within the third path 14 between the optical beam switch 16 and the third reflector 24. Thus, when optical switch 16 operates in its first mode, a stable resonator is formed by reflectors 20 and 24 and gain medium 26, and when optical switch 16 operates in its second mode, an unstable resonator is formed by reflectors 22 and 24 and gain medium 26. Because the third propagation path 14 is common to both operating modes of optical switch 16, placing the laser gain medium 26 in that path 14 allows the use of a single gain medium for both the stable and unstable resonators.

For precise wavelength selection while the laser operates in the stable mode, reflector 20 preferably includes a grating reflector 28 together with tilted Fabry-Perot etalon 30, beam expander 32 and aperture 34.

Laser gain medium 26 is accompanied by a conventional excitation means 28 which supplies energy bursts to the gain medium to excite or "pump" its atoms or molecules to high energy levels. For example, the excitation means may be a flashtube or laser which irradiates the gain medium with a large burst of light. As further examples, if the gain medium 26 is a gas, the excitation means may also be a high voltage diode which emits an electron beam, or it may be a pair of electrodes between which a strong electric field is applied to produce an electric discharge in the gain medium.

Figure 2:
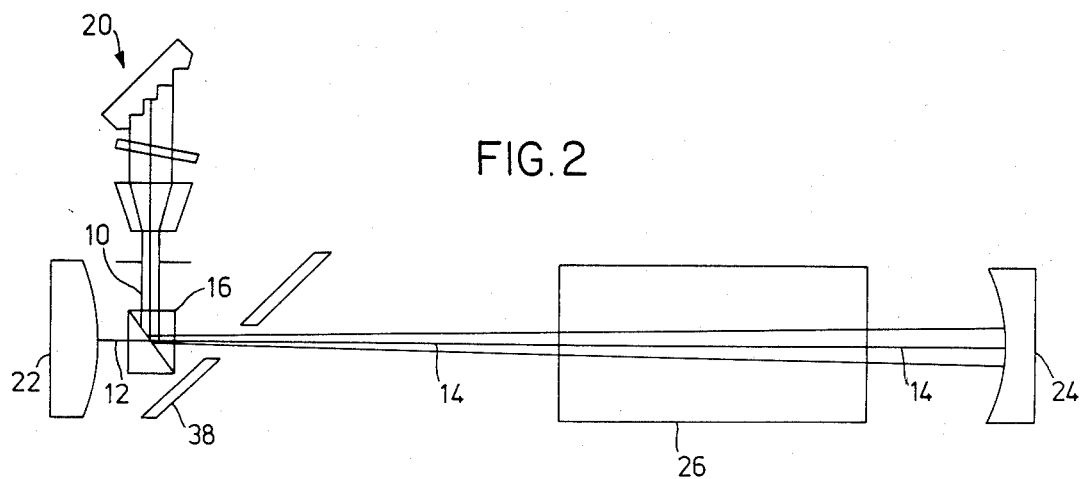
FIG. 2 is a schematic drawing of the laser of FIG. 1 showing its operation in the stable resonator mode.

Each time it emits a burst of light, the laser of the present invention operates as follows: Referring to FIG. 2, electrical control circuit 18 initially applies an electrical signal to optical beam switch 16 which places the optical switch in its first mode of operation. In this mode the first and third paths 10 and 14 are optically connected and a stable resonator is formed by reflectors 20 and 24. Laser excitation means 28 is activated so as to emit a burst of energy which excites laser gain medium 26, thereby initiating laser oscillations in the stable resonator. As the laser light reflects back and forth between the two reflectors 20 and 24, the intensity of the light progressively increases due to stimulated emission by gain medium 26. The light path is represented by the shaded region in FIG. 2.

When the laser oscillations have had time to build up to a desired power level, electrical control circuit 18 electrically commands optical beam switch 16 to change to its second mode of operation. Control circuit 18 may generate this command after a predetermined time period or, more preferably, control circuit 18 may include a light detector 36 which measures the intensity of the light in the stable resonator and generates the mode change command when the intensity of the laser light reaches a predetermined threshold. Based on published results with other injection-locking systems, the light intensity in the stable resonator should be more than adequate to ensure efficient injection locking when it reaches a power level of $10^{-5}$ times the peak output power of the unstable resonator.

Figure 3:
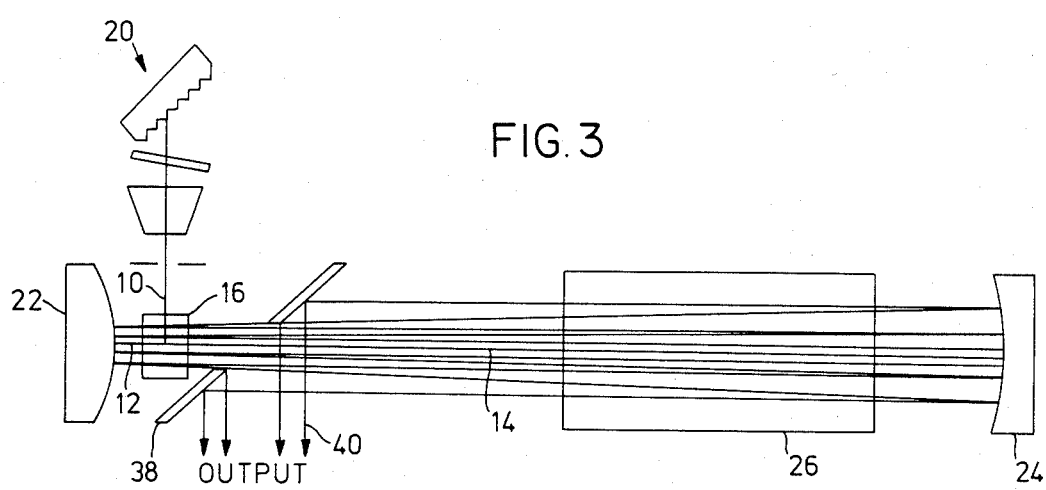
FIG. 3 is a schematic drawing of the laser of FIG. 1 showing its operation in the unstable resonator mode.

In response to the aforesaid electrical command signal from control circuit 18, optical beam switch 16 changes to its second mode of operation, shown in FIG. 3, whereby reflector 22 replaces reflector 20 in the laser resonator, thereby creating an unstable resonator. The light beam generated by the stable resonator serves as "seed radiation" which is then greatly amplified by the unstable resonator. The amplified light beam in the unstable resonator, represented by the shaded region in FIG. 3, has its spatial and temporal characteristics locked into close conformity with those of the "seed radiation" from the stable resonator.

After it has been amplified to the required power level, the light beam in the unstable resonator may be extracted to form an output beam by any extraction technique conventionally used in an unstable resonator, as discussed in the Background of the Invention. In the preferred embodiment shown in FIG. 3, an annular scraper mirror 38 deflects the output beam 40 outside the laser cavity when the beam diameter exceeds the inner diameter of the annulus 38.

As shown in FIG. 4, the preferred embodiment of the optical beam switch 16 includes two beam splitter polarizers 42 and 44 and a Pockels cell 46. Each beam splitter polarizer is highly reflective to light of one polarization and highly transmissive to light of the orthogonal polarization. In FIG. 4, the polarizers are depicted as transmissive to horizontally polarized light, represented by a two-headed arrow, and reflective to vertically polarized light, represented by two concentric circles.

Pockels cell 46 is designed to rotate the polarization of light passing therethrough by either zero degrees or ninety degrees depending on whether a low or high voltage, respectively, is applied to the Pockels cell by electrical control circuit 18. As will be explained below, the optical beam switch operates in its first (reflective) and second (transmissive) modes when control circuit 18 applies a high and a low voltage, respectively, to Pockels cell 46.

Figure 4A:
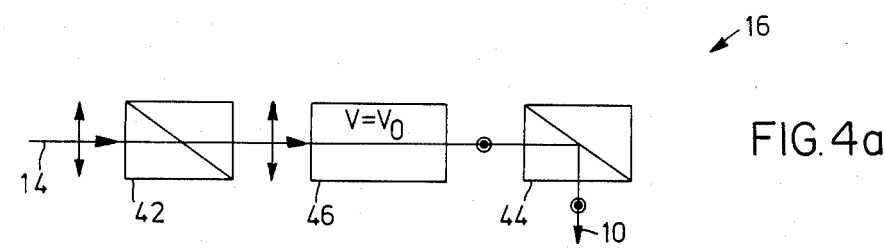
FIG. 4a shows a high voltage applied to the Pockels cell resulting in a 90° polarization rotation producing vertically polarized light.

In operation, the first polarizer 42 allows only horizontally polarized components of light from the third path 14 to be transmitted toward Pockels cell 46; vertically polarized components are reflected to the side of path 14 and are lost. When a high voltage $V_o$ is applied to the Pockels cell as shown in FIG. 4a, the horizontally polarized light from path 14 undergoes a ninety degree polarization rotation passing through the Pockels cell and emerges as vertically polarized light. The second polarizer 44 reflects the vertically polarized light toward the first optical path 10.

Figure 4B:
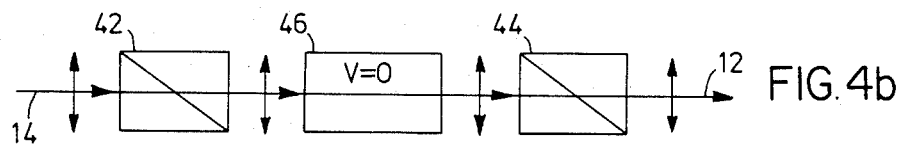
FIG. 4b shows a low or zero voltage applied to the Pockels cell resulting in no polarization rotation.

When a low or zero voltage is applied to the Pockels cell as shown in FIG. 4b, the horizontally polarized light from path 14 passes through the Pockels cell without undergoing any polarization rotation. The second polarizer 44 transmits this horizontally polarized light toward the second optical path 12.

The two polarizers 42 and 44 and the Pockels cell 46 operate identically for light travelling in the opposite direction, i.e., for light travelling toward the second polarizer 44 from the first or second path 10 or 12. Thus, optical beam switch 16 optically connects the third optical path 14 to either the first path 10 or the second path 12 according to whether the voltage applied to the Pockels cell 46 is high or low.

Other types of birefringent electro-optic cells could be substituted for Pockels cell 46, but a Pockels cell is preferred because of its fast response time, i.e., the speed with which it can switch from one mode to the other.

We claim:
1. An injection-locked unstable laser for producing a laser beam in an unstable resonator whose spatial and temporal characteristics conform with those of a laser beam from a stable resonator, comprising:

first, second and third reflectors;
means for permitting propagation of light along first, second and third optical propagation paths between the first, second and third reflectors, respectively, and a point of intersection of the three paths, the three propagation paths having respective optical path lengths and the three reflectors having respective focal lengths such that optically connecting the first and third paths at said intersection point causes the first and third reflectors and the first and third paths therebetween to constitute a stable resonator cavity, and optically connecting the second and third paths at said intersection point causes the second and third reflectors and the second and third paths therebetween to constitute an unstable resonator cavity;
an optical switch, positioned at the intersection point of the three paths and having first and second operating modes, for optically connecting the third path to either the first or the second path according to whether the switch is operating in the first or second mode;
a laser gain medium positioned within the third propagation path between the optical switch and the third reflector;
means for exciting the laser gain medium; and
means for controlling the optical switch so that, when the laser gain medium is excited, the switch initially operates in the first mode and subsequently operates in the second mode;
whereby the laser initially operates in a stable mode producing laser light, and subsequently operates in an unstable mode producing laser light whose spatial and temporal characteristics conform with those of the light produced in the stable mode.

* * * * *